US 7,002,723 B2

(12) United States Patent
Enomoto et al.

(10) Patent No.: US 7,002,723 B2
(45) Date of Patent: Feb. 21, 2006

(54) DISPLAY DEVICE

(75) Inventors: Shintaro Enomoto, Yokohama (JP); Shuichi Uchikoga, Yokohama (JP); Isao Amemiya, Machida (JP); Yutaka Nakai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 10/968,989

(22) Filed: Oct. 21, 2004

(65) Prior Publication Data
US 2005/0117192 A1 Jun. 2, 2005

(30) Foreign Application Priority Data
Oct. 21, 2003 (JP) .............................. 2003-360535

(51) Int. Cl.
*G02F 1/153* (2006.01)
*G02F 1/15* (2006.01)
*G09G 3/38* (2006.01)

(52) U.S. Cl. ...................... 359/273; 359/272; 359/271; 359/270; 359/267; 359/265; 345/105

(58) Field of Classification Search ........ 359/265–275, 359/253, 254; 345/76, 77, 81, 85, 87–90, 345/105, 107; 252/583, 600; 219/400; 544/347; 546/257
See application file for complete search history.

(56) References Cited

U.S. PATENT DOCUMENTS 6,734,305 B1 * 5/2004 Pierre et al. ................. 544/347
6,791,737 B1 * 9/2004 Giron .......................... 359/265

FOREIGN PATENT DOCUMENTS

| JP | 9-309173 | 12/1997 |
|---|---|---|
| JP | 10/134961 | 5/1998 |
| JP | 200-287172 | 10/2002 |
| JP | 2003-21848 | 1/2003 |
| JP | 2003-241188 | 8/2003 |

OTHER PUBLICATIONS

Kazuki Nishimura, et al., Solution Electochemiluminescent Cell with a High Luminance Using an Ion Conductive Assistant Dopant, Jpn. J. Appl. Phys., vol. 40, 2001, pp. L1323-L1326.
Akio Yasuda, et al., Electrochromic Properties of Vacuum Evaporated Organic Thin Films, Part I. Electrochromic Thin Films of the Three Primary Colors, J. Electroanal. Chem, vol. 247, 1988, pp. 193-202.

* cited by examiner

*Primary Examiner*—Loha Ben
*Assistant Examiner*—Jack Dinh
(74) *Attorney, Agent, or Firm*—Oblon, Spivak, McClelland, Maier & Neustadt, P.C.

(57) ABSTRACT

In a display device, a first electrode and a second electrode are mounted on a first substrate, a second substrate is arranged to face the first substrate with a gap provided between the first substrate and the second substrate, and a third electrode is mounted on the second substrate. A first layer is formed in a gap between the first substrate and the second substrate at the side of the first substrate and containing a ECL material that emits light due to electrochemical oxidation or reduction. A second layer is formed in the gap between the first substrate and the second substrate at the side of the second substrate and containing a EC material having the color changed due to electrochemical oxidation or reduction.

22 Claims, 3 Drawing Sheets

DISPLAY DEVICE

CROSS-REFERENCE TO RELATED APPLICATIONS

This application is based upon and claims the benefit of priority from prior Japanese Patent Application No. 2003-360535, filed Oct. 21, 2003, the entire contents of which are incorporated herein by reference.

BACKGROUND OF THE INVENTION

1. Field of the Invention

The present invention relates to a display device capable of performing the functions of both a light-reflecting display and a light-emitting display, particularly, to a display device that permits achieving light-emitting display by utilizing an electrochemiluminescence or electrogenerated chemiluminescence (ECL) material performing an ECL display and also permits achieving light-reflecting display by utilizing an electrochromic (EC) material performing the EC display.

2. Description of the Related Art

A translucent liquid crystal display (LCD) device capable of performing both light-reflecting display and light-emitting display is proposed as a display for, for example, a mobile phone that is used outdoors and indoors. The translucent LCD is disclosed in, for example, Japanese Patent Disclosure (Kokai) No. 2003-241188. As shown in FIG. 3 and described on pages 3 to 5 of this patent document, a reflective layer having an irregular surface is formed in a part of the pixel for the reflective display for displaying the pixel by reflecting external light rays. Also, a transmitting display section is formed in the other region for the light-emitting display in which the transmittance of the light rays emitted from a back-light is controlled so as to cause the light rays to be directed outward. The back-light is arranged below the transmitting display section.

In the method outlined above, in which it is possible to achieve both the light-reflecting display and the light-emitting display, it is possible to achieve a sufficiently bright and clear display depending on the brightness of the back-light when it comes to the light-emitting display mode. However, when it comes to the light-reflecting display mode, a difficulty remains unsolved in terms of the capability of obtaining a clear display having a sufficiently high contrast because of the limitation in the principle of the display of the liquid crystal that a polarizing plate is used and the limitation in terms of the display area that a single pixel is divided into two regions consisting of a light-reflecting display region and a light-emitting display region.

In contrast, an electrochromic display (ECD) is known to the art as a display that permits a light-reflecting display having a high contrast. The particular display device is disclosed in, for example, Japanese Patent Disclosure No. 2003-21848. As described on pages 4 to 14 of this patent document with reference to FIG. 1, an electrochromic (EC) material and an electrolyte are arranged between two electrodes so as to form the particular display device. Incidentally, the electrochromic material noted above is a material whose properties are changed as a result of the electrochemical oxidation or reduction. Specifically, the color of the electrochromic material noted above is changed or the electrochromic material is precipitated or dissolved as a result of the electrochemical oxidation or reduction. However, a difficulty remains unsolved in the electrochromic display (ECD) in that the display is hard to see in the dark place because the electrochromic display (ECD) performs light-reflecting display alone.

BRIEF SUMMARY OF THE INVENTION

According to an aspect of the present invention, there is provided a display device, comprising:
a first substrate;
a first electrode and a second electrode both mounted on the first substrate;
a second substrate arranged to face the first substrate with a gap provided between the first and second substrates;
a third electrode mounted on the second substrate:
a first layer formed in the gap between the first substrate and the second substrate, the first layer being located at the side of the first substrate, and containing a ECL material that emits light due to electrochemical oxidation or reduction; and
a second layer formed in the gap between the first substrate and the second substrate, the second layer being located at the side of the second substrate, and containing a EC material having the color changed due to electrochemical oxidation or reduction.

In the display device, it is possible for the first layer to be a solidified layer or a liquid layer, the first layer containing a ECL material and an electrolyte or an electrolyte containing ions associated with EC reaction of the second layer to be a solidified layer containing a EC material.

Also, in the display device, it is possible for the first layer to be a solidified layer containing a ECL material and an electrolyte or an electrolyte containing ions associated with EC reaction of the second layer to be a solidified layer containing a EC material and an electrolyte or an electrolyte containing ions associated with EC reaction. Further, in the display device, it is possible for the first layer or the second layer to be a liquid layer.

Also, it is possible for the display device according to an another aspect of the present invention to comprise a first layer, which is a solidified layer containing a ECL material and an electrolyte or an electrolyte containing ions associated with EC reaction of a second layer, which is a solidified layer containing a EC material, and a third layer, which is a solidified layer containing an electrolyte or an electrolyte containing ions associated with EC reaction of the ECL material and which is interposed between the first layer and the second layer. Further, in the display device, it is possible for any one of the first, second and third layers to be a liquid layer.

DETAILED DESCRIPTION OF THE INVENTION

A display device of the present invention, which is capable of performing the functions of both a light-reflecting display and a light-emitting display, will now be described in detail with reference to the accompanying drawings.

Figure 1:
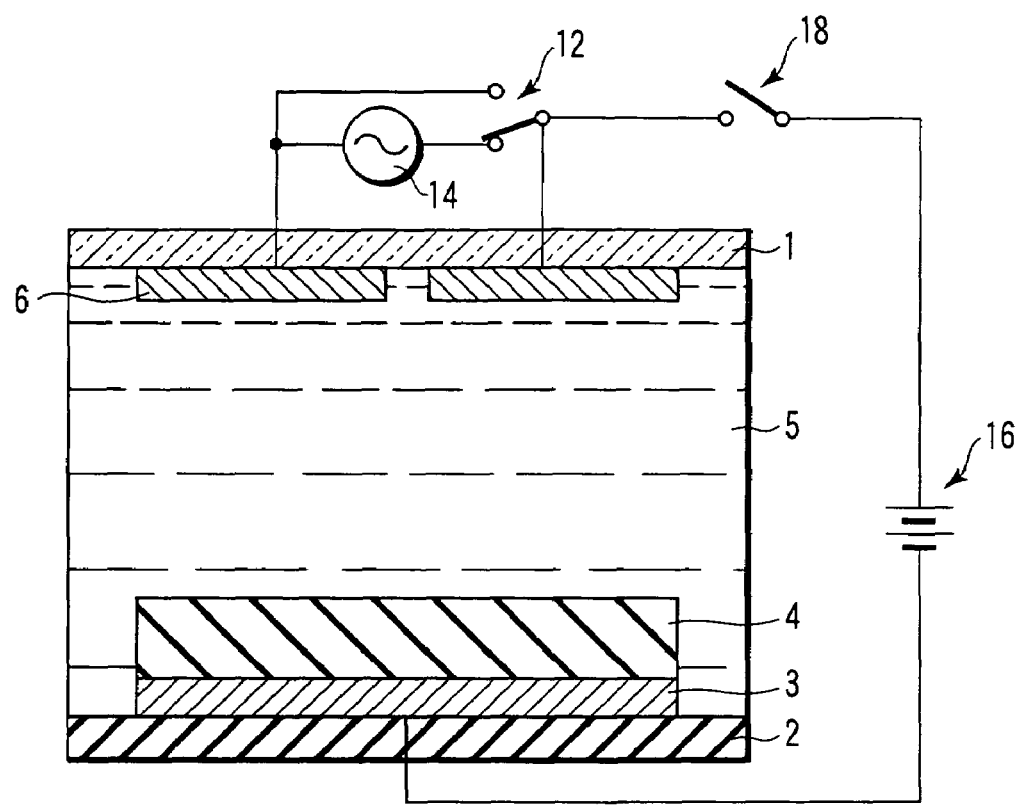
FIG. 1 is a cross-sectional view schematically showing the construction of a display device according to a first embodiment of the present invention.

FIG. 1 is a cross-sectional view schematically showing the construction of a display device, which is capable of performing the functions of both a light-reflecting display and a light-emitting display, according to a first embodiment of the present invention. As shown in FIG. 1, the display device according to an aspect of the present invention comprises a first substrate 1. A first electrode 6 and a second electrode 7, which are electrically separated from each other, are mounted on the first substrate 1. A second substrate 2 is arranged to face the first substrate 1 with a gap provided therebetween, and a third electrode 3 is mounted on the second substrate 2.

A second layer 4 containing an EC material having the color changed due to electrochemical oxidation or reduction is formed in the gap between the first substrate 1 and the second substrate 2 such that the second layer 4 is positioned on the side of the second substrate 2. Also, a first layer 5 is formed of an electrolyte containing ECL material that emits light due to electrochemical oxidation or reduction and containing ions associated with the EC reaction and is arranged in the gap between the first substrate 1 and the second substrate 2 such that the first layer 5 is positioned on the side of the first substrate 1. A pixel is formed by a set of the first electrode 6, the second electrode 7 and the third electrode 3. Also, the third electrode 3 and the second layer 4 formed on the third electrode 3 are patterned for each pixel. Pluralities of pixels are arranged in a manner to form a matrix between the first substrate 1 and second substrate 2, the first and second substrates 1 and 2 having substantially the same size, so as to form a display device.

A light emitting material exhibiting electrochemiluminescence (ECL) is oxidized so as to form cation radicals and is reduced so as to form anion radicals in the vicinity of the first electrode 5 to which a voltage is applied. When these cation radicals and anion radicals are associated with each other so as to cause these radicals to be neutralized and, thus, to disappear, an excited state is formed in the ECL material and light rays are emitted from the ECL material in the deactivating process. The light-emitting display is performed by the particular mechanism. This phenomenon is so called as electrochemiluminescence or electrogenerated chemiluminescence (ECL). The light emitting material exhibiting electrochemiluminescence (ECL) is called as the electrochemiluminescence (ECL) material in this specification.

On the other hand, the second layer 4 contains an electrochromic (EC) material in which an electrochemical oxidation reaction or reducing reaction, i.e., EC reaction is generated by the voltage application so as to have the color changed. It is required that the first layer contains an electrolyte such as an electrolyte containing ions associated with EC reaction of the EC material. In the electrochromic (EC) material, a color is developed or erased when the coloring material is reduced, and a color is erased or developed when the coloring material is oxidized. For example, in the case where $WO_3$ is used as the EC (electrochromic material), the color is erased by the oxidizing reaction so as to cause the electrochromic material to be rendered transparent, and the color is developed by the reducing reaction so as to cause the electrochromic material to be colored blue. The light-reflecting display is performed by utilizing the particular characteristics of the EC material described above.

In the display device of the present invention, the first electrode 6 and the second electrode 7 are connected to an AC power source 14 via a switching element 12 as shown in FIG. 1. In contrast, the first electrode 6, the second electrode 7 and the third electrode 3 are connected to a DC voltage source 16 via a switching element 18. In the light-emitting display mode of the display device shown in FIG. 1, the switching element 18 is opened so as to cause the first, second and third electrodes 6, 7 and 3 to be disconnected from the DC voltage source 16, and the switching element 12 is closed so as to permit the first electrode 6 and the second electrode 7 to be connected to the AC power source 14. It follows that an AC electric field is generated between the first electrode 6 and the second electrode 7, with the result that the first layer 5 containing a light-emitting material is allowed to emit light and, thus, the color of the emitted light is observed. If color filters are formed on the substrate 1 of this pixel, the colors of the filters are observed from the side of the substrate 1. If the voltage application from the AC power source 14 is stopped, light is not emitted from the first layer 5, with the result that the background color of the pixel, e.g., black, is displayed. On the other hand, in the light-reflecting display mode, the switching element 12 is switched so as to permit the first electrode 6 and the second electrode 7 to be connected to each other and to permit the switching element 18 to be closed so as to cause the first and second electrodes 6 and 7 to be connected to the DC voltage source 16 together with the third electrode 3. It follows that a DC electric field is generated between the electrodes mounted on the first substrate 1, i.e., the first and second electrodes 6, 7, and the electrode mounted on the second substrate 2, i.e., the third electrode 3. Such being the situation, the second layer 4 containing the EC material is colored or rendered transparent. As a result, the color of the colored second layer 4 is observed from outside the substrate 1 or the background color of the substrate 2 is observed from outside the substrate 1 through the transparent second layer 4. If the polarity of the voltage from the DC voltage source 16 is changed, the second layer 4 that is colored is rendered transparent or the second layer 4 that is transparent is colored, with the result that the background color of the substrate 2 or the color of the second layer 4 is observed from outside the substrate 1. In an example in which the EC material is WO3, the EC material is colored due to the electrochemical reducing reaction when a negative potential is applied to the electrode on the EC material, and the EC material is transparent due to the electrochemical oxidation reaction when a positive potential is applied to the electrode on the EC material.

As described above, where the pixel structure shown in FIG. 1 is observed from the side of the substrate 1, the substrate 1 is transparent, and the first electrode 6 and the second electrode 7 are formed of a material that is substantially transparent. In contrast, where the pixel structure is observed from the side of the second substrate 2, each of the substrate 2 and the third electrode 3 is formed of a transparent material and each of the first and second electrodes 6, 7 or the substrate 1 act as a reflection layer or provided with a reflection layer thereon.

Under the circumstances, it is possible for the user to select the light-emitting display mode or the light-reflecting display mode in the light-emitting display device of the construction described above. In other words, it is possible for the user to designate which of the display modes to be selected in accordance with the environment of the use. In accordance with the information on the designation of the switching operation, the switching elements 12 and 18 are switched so as to permit a prescribed voltage to be applied to the first to third electrodes. It follows that the pixel structure can be displayed in the light-emitting display mode or the light-reflecting display mode.

The driving method of the display device according to the first embodiment of the present invention will now be described in detail.

Figure 2A:
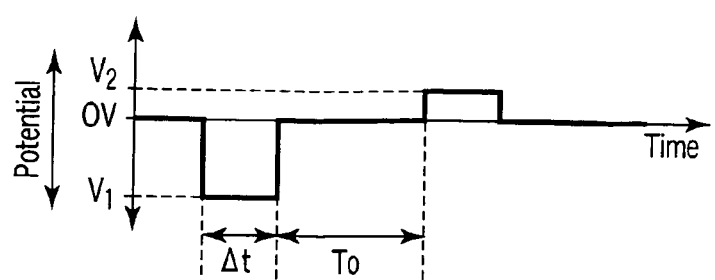
FIGS. 2A and 2B show the wave-forms for explaining the relationship between the electrode potential and the absorbance in the light-reflecting display mode achieved in the display devices shown in FIG. 1, respectively.
Figure 2B:
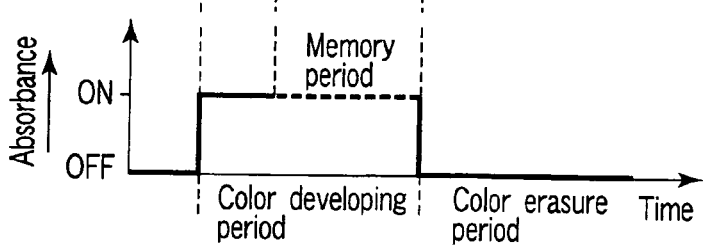

In the light-reflecting display mode, voltage is applied first from the DC voltage source 16 to the third electrode 3 so as to set up the potential at which the EC material is reduced or the EC material is oxidized. In this stage, the switching element 12 is switched so as to maintain the first electrode 6 and the second electrode 7 at the same potential. FIGS. 2A and 2B show as an example the potential of the third electrode 3 and the state of the color development and the color erasure in the second layer (EC layer) 4 at this stage. As shown in FIG. 2A, if the third electrode 3 is set at a potential $V_1$ for a prescribed period $\Delta t$, the EC material in the EC layer 4 is reduced so as to develop a color. It should be noted that the potential $V_1$ noted above corresponds to a negative reducing potential of the EC material. As shown in FIG. 2B, the absorbance of the EC material forming the second layer 4 is increased at the potential $V_1$ so as to cause the second layer 4 to develop a color. A prescribed time $T_0$ later, the second layer 4 formed of the EC material continues to develop the color even if the potential of the third electrode 3 is brought back to the potential of 0V because the EC material exhibits the memory properties. In the case of using, for example, $WO_3$ as the EC material, it is possible for the memory period $T_0$ to be maintained for about several hours in the longest case, though the memory period $T_0$ is dependent on conditions. For erasing the developed color, a potential $V_2$ is applied to the third electrode 3. To be more specific, the EC material is oxidized under the potential $V_2$ so as to erase the color of the second layer 4. It should be noted that the potential $V_2$ corresponds to a positive oxidizing potential of the EC material. Upon application of the potential $V_2$ to the third electrode 3, the absorbance of the EC material is decreased so as to erase the color of the second layer 4.

Incidentally, depending on the EC material used, the ions in the electrolyte layer 5 containing the ECL material are also involved in the EC (oxidation-reduction) reaction for the light-reflecting display mode. In the case of using the EC layer 4 consisting of, for example, $WO_3$ acting as the ECL material, lithium ions $Li^+$ are contained in the electrolyte layer 5 formed of the ECL material. The supporting salt of the lithium ions $L^+$ contained in the electrolyte layer 5 includes, for example, $LiCF_3SO_3$. In this case, the EC reaction takes place as shown in formula (1) given below:

$$WO_3 + e^- \times Li^+ \Leftrightarrow Li_xWO_3 \quad (1)$$

The color erasure (transparency) is performed in the oxidizing reaction on the left term of formula (1) given above, and the color development (blue) is performed in the reducing reaction on the right term of formula (1) given above.

Figure 3A:
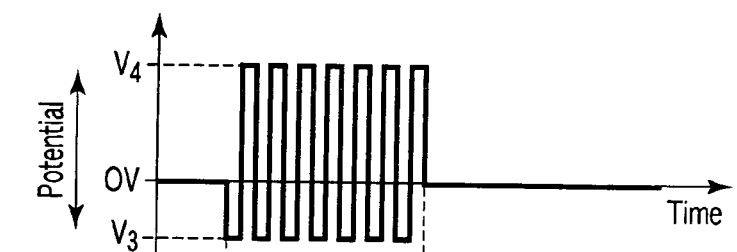
FIGS. 3A and 3B show the wave-forms for explaining the relationship between the electrode potential and the absorbance in the light-emitting display mode achieved in the display devices shown in FIG. 1, respectively.
Figure 3B:
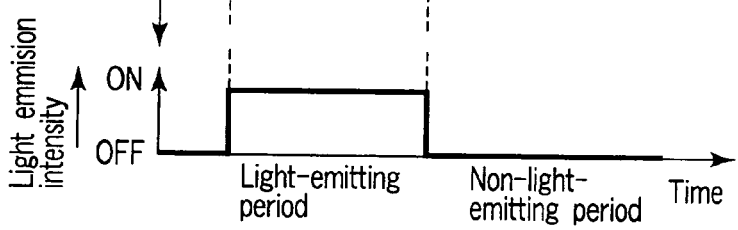

In the light-emitting display mode, a voltage is not applied to the third electrode 3, and an AC voltage is applied between the first electrode 6 and the second electrode 7. FIGS. 3A and 3B show the change in the potential of the first electrode 6 and the state of the light emission/non-emission of the first layer (ECL electrolyte layer) 5 based on the change in the potential of the first electrode 6. The potential of the second electrode 7 (not shown) has a polarity opposite to that of the first electrode 6 during the period of the light-emitting state. As shown in FIG. 3A, an AC voltage having a potential on the lower side of $V_3$ and a potential on the higher side of $V_4$ is alternately applied between the first electrode 6 and the second electrode 7. It should be noted that the potential $V_3$ noted above corresponds to a negative reducing potential for converting the ECL material into anion radicals, and the potential $V_4$ noted above corresponds to a positive oxidizing potential for converting the ECL material into cation radicals. The anion radicals and the cation radicals of the ECL material are alternately formed in the first and second electrodes 6 and 7. The anion and cation radicals thus generated are associated with each other so as to cause these radicals to be neutralized and, thus, to disappear. What should be noted is that the light-emitting material thus excited is formed and deactivated so as to emit light. Unless the AC voltage that fluctuates between the potentials $V_3$ and $V_4$ as described above is applied, the non-emitting state is maintained. It suffices to set the frequency of the AC voltage at, for example, about scores of Hz.

According to the first embodiment of the present invention, it is possible for a single display device to perform the display operation in two modes by switching both the light-reflecting display mode and the light-emitting display mode. Also, since the electrolyte is used commonly for the light-reflecting display mode and the light-emitting display mode, it is possible to prevent the display device from being rendered bulky by superposing the cell for the light-reflecting display mode with the cell for the light-emitting display mode. Further, since the display device for the embodiment of the present invention differs from the type that a single pixel is divided into two regions for performing the light-reflecting display operation and the light-emitting display operation, it is possible to utilize effectively the pixel region.

Each constituent of the display device according to the embodiment of the present invention will now be described in detail.

It is possible for the first substrate 1 to be formed of, for example, glass or a plastic material such as PET, PEN, PES or PC. Where the first substrate 1 constitutes the observing surface, it is desirable for the first substrate 1 to be formed of a material that is low in the absorbance of the visible light region.

Where each of the first electrode 6 and the second electrode 7, which are formed on the first substrate 1, acts as a transparent electrode (i.e., where the observing side is formed on the side of the first substrate 1), it is possible for each of the first electrode 6 and the second electrode 7 to be formed of a metal oxide semiconductor including, for example, an oxide of a transition metal such as titanium, zirconium, hafnium, strontium, zinc, indium, yttrium, lanthanum, vanadium, niobium, tantalum, chromium, molybdenum, or tungsten; a perovskite material such as $SiTiO_3$, $CaTiO_3$, $BaTiO_3$, $MgTiO_3$ or $SrNb_2O_6$; a composite oxide thereof; a mixture of these oxides; and GaN. On the other hand, where each of the first electrode 6 and the second electrode 7 is used as a reflective electrode (i.e., in the case where the side of the first substrate 1 is opposite to the observing surface), it is possible to use, for example, Al or Ag for forming each of the first electrode 6 and the second electrode 7. Also, it is desirable for each of the first electrode 6 and the second electrode 7 to be sized large in order to increase the aperture rate. It is also desirable for the first electrode 6 and the second electrode 7 to be formed of the same material and to be sized equal to each other.

The second substrate 2 can be formed of the material equal to that used for forming the first substrate 1. Where the observing surface is formed on the side of the second substrate 2, it is desirable for the second substrate 2 to be formed of a material low in its absorbance of the visible light region.

The third electrode 3 formed on the second substrate 2 can be formed by using the material equal to that used for forming the first electrode 6 and the second electrode 7.

Also, it is desirable for the third electrode 3 to be sized large in order to increase the aperture rate and to be positioned so as to face both the first electrode 6 and the second electrode 7.

The second layer 4 containing an EC material is formed on the third electrode 3. The EC material contained in the second layer 4 include, for example, inorganic materials such as $MnO_2$, CoOOH, NiOOH, CuO, $RuO_2$, $Rh_2O_3$, $IrO_x$, prussian blue, $WO_3$, $MoO_3$, $TiO_2$, $V_2O_5$, $Nb_2O_5$ and AgI; organic materials having a low molecular weight such as a viologen-based organic material, ortho chloranil, 4-benzoylpyridium derivative, ruthenium tris, ruthenium-bis, osmium-tris and osmium-bis type transition metal complex, a polynuclear complex, or ruthenium-cis-diaqua-bipyridyl complex, or a phthalocyanine dye/pigment, a naphthalocyanine dye/pigment, a porphyrin dye/pigment, a perylene dye/pigment, an anthraquinone dye/pigment, an azo dye/pigment, a quinophthalone dye/pigment, a naphthoquinone dye/pigment, a cyanine dye/pigment, a merocyanine dye/pigment, a diphthalocyanine complex, 2,4,5,7-tetranitro-9-fluorene, 2,4,7-trinitro-9-fluorenylidene matrononitrile, and tetracyano quino dimethane; electrically conductive high molecular weight compounds such as a polypyrrole derivative, a polythiophene derivative, a polyaniline derivative, a polyazulene derivative, polyisothianaphthene, poly(N-methyl isoindole), poly(dithieno[3,4-b:3',4'-d] thiophene, a polydiallyl amine derivative, a polypyrrolopyrrole derivative, and a Ru complex series conductive high molecular weight compound, though the EC material contained in the second layer 4 is not limited to the materials exemplified above. Where an inorganic material is used for forming the second layer 4, the second layer 4 is formed by, for example, a vapor deposition method, a sputtering method, a gaseous phase growth method, a sol-gel method or a fine particle sintering method. In contrast, in the case of using an organic material having a low molecular weight, the second layer 4 is formed by, for example, a vapor deposition method or a coating-drying method (using a solution). Further, in the case of using a conductive high molecular weight compound, the second layer 4 is formed by the coating-drying method (using a solution). By any of these methods, a solidified layer can be prepared.

The first layer 5 containing an ECL material and an electrolyte is formed between the first substrate 1 having the first electrode 6 and the second electrode 7 formed thereon and the second substrate 2 having the third electrode 3 and the second layer 4 laminated thereon. A polycyclic aromatic compound is used as the ECL material. To be more specific, the polycyclic aromatic compounds used as the ECL material include, for example, a naphthalene derivative such as rublene or 5,12-diphenyl naphthalene; an anthracene derivative such as 9,10-diphenyl anthracene; a pentacene derivative such as 6,10-diphenyl pentacene; π electron conjugated high molecular weight compounds such as poly(para-phenylene vinylene) derivative, a polythiophene derivative, a poly(para-phenylene) derivative, and a polyfluorene derivative; hetero aromatic compounds such as coumarin; a chelate metal complex such as Ru(bpy)32; and organic metal compounds such as tris(2-phenyl pyridine) iridium and a chelate lanthanoide complex. The electrolyte comprises a solvent (in the case where the first layer is in the form of a liquid layer formed of a liquid electrolyte) or a gel-like high molecular weight compound that is swollen by the solvent (in the case where the first layer is in the form of a solidified layer formed of a solidified electrolyte) and a supporting salt dissolved in the solvent. The supporting salt used in the present invention includes, for example, tetrabutyl ammonium perchlorate, potassium hexafluoro phosphate, lithium trifluoromethane sulfonate, lithium perchlorate, tetra-n-butyl ammonium tetrafluoroborate, tripropyl amine, and tetra-n-butyl ammonium sulfonate. The solvent used in the present invention for preparing the liquid electrolyte includes, for example, acetonitrile, N,N-dimethyl formamide, propylene carbonate, o-dichloro benzene, glycerin, water, ethyl alcohol, propyl alcohol, dimethyl carbonate, ethylene carbonate, γ-butyrolactone, NMP, 2-methyl tetrahydro furan, toluene, tetrahydro furan, benzonitrile, cyclohexane, normal hexane, acetone, nitrobenzene, 1,3-dioxo furan, furan, and benzotrifluoride. In contrast, the gel-like high molecular compounds used in the present invention include, for example, polyacrylonitrile (PAN), a copolymer between vinylidene fluoride (VDF) and hexafluoro propylene (HFP), and polyethylene oxide (PEO). Where the first layer 5 is in the form of a liquid layer, it suffices for the supporting salt and the ECL material noted above to be dissolved in the solvent noted above. For preparing the first layer 5 in this case, it suffices to pour the resultant solution into the free space (gap) formed between the first substrate 1 having the first electrode 6 and the second electrode 7 formed thereon and the second substrate 2 having the third electrode 3 and the second layer 4 laminated thereon. Also, in the case where the first layer 5 is in the form of a solidified layer, it suffices for the first substrate 1 or the second substrate 2 to be coated with the solution of the gel-like high molecular weight compound containing the supporting salt and the solvent, followed by drying the coated solution. In this case, a relatively large amount of the solvent is contained in the solution of the gel-like high molecular weight compound.

Figure 4:
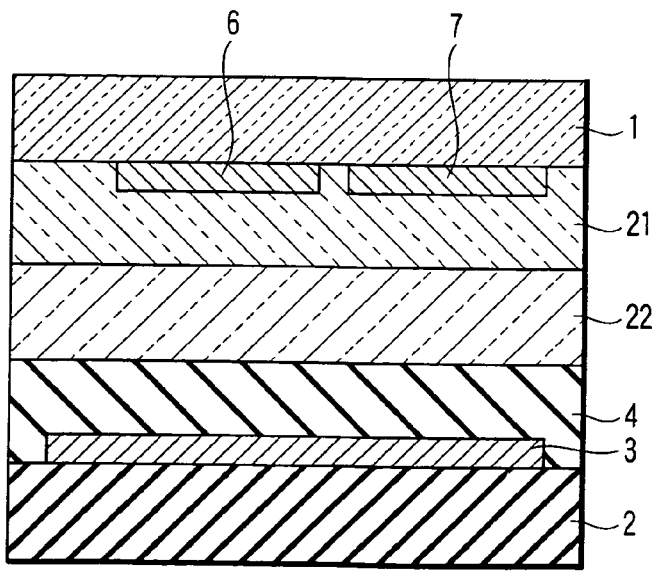
FIG. 4 is a cross-sectional view schematically showing the construction of a display device according to a second embodiment of the present invention.

A display device according to a second embodiment of the present invention will now be described. FIG. 4 is a cross-sectional view showing the construction of the display device according to the third embodiment of the present invention. The following description covers those portions alone of the second embodiment which differ from the second embodiment, and the similar portions are denoted by the same reference numerals in the drawings so as to avoid the duplicated description.

The display device according to the second embodiment of the present invention differs from the display device for the second embodiment in that, in the third embodiment, an electrolyte layer (ECL layer) 21, which is a solidified layer containing the ECL material, is formed to cover the first electrode 6, and the second electrode 7, which are formed on the first substrate 1, and another electrolyte layer 22, which is a solidified layer, is formed between the ECL layer 21 and the EC layer 4 as shown in FIG. 4. It is possible to drive the display device for the third embodiment as in the first embodiment. In the case of employing a three-layer structure as in the third embodiment, it is possible for all of the three layers to be formed of solidified layers. Alternatively, it is possible for any one of the three layers to be a liquid layer. The electrolyte layer 22, which is a solidified layer, is formed on the EC layer 4 formed on the substrate 2 by using the material equal to the gel-like high molecular weight compound described previously. The electrolyte layer 22 can be formed by the method similar to the method of forming the gel-like high molecular weight compound layer described previously. It is possible to bond the substrate 2 to the substrate 1 having the electrolyte layer 21 containing an ECL material formed thereon, with a gap between the first substrate 1 and the second substrate 2 controlled by using, for example, a spacer. Also, where the electrolyte layer 22 is in the form of a liquid layer, it is possible to bond the substrate 2 having the EC layer 4 formed thereon to the substrate 1 having the electrolyte layer 21 containing an ECL material formed thereon, with a gap between the first substrate 1 and the second substrate 2 controlled by using, for example, a spacer so as to form a cell. In this case, a liquid material forming the electrolyte layer 22 is poured into the cell thus formed. Further, where the EC layer 4 or the ECL layer 5 is in the form of a liquid layer, it is possible for the EC material or the supporting salt containing the ECL material to be dissolved or dispersed in the solvent and to pour the resultant solution or dispersion into the cell. In this case, one of the EC layer 4 and the ECL layer 5, which is in the form of a solidified layer, is formed on the substrate, followed by forming the electrolyte layer 22, which is a solidified layer, on the solidified EC layer 4 or the solidified ECL layer 5 formed on the substrate. Then, a cell is formed, followed by pouring a liquid layer into the cell.

Figure 5:
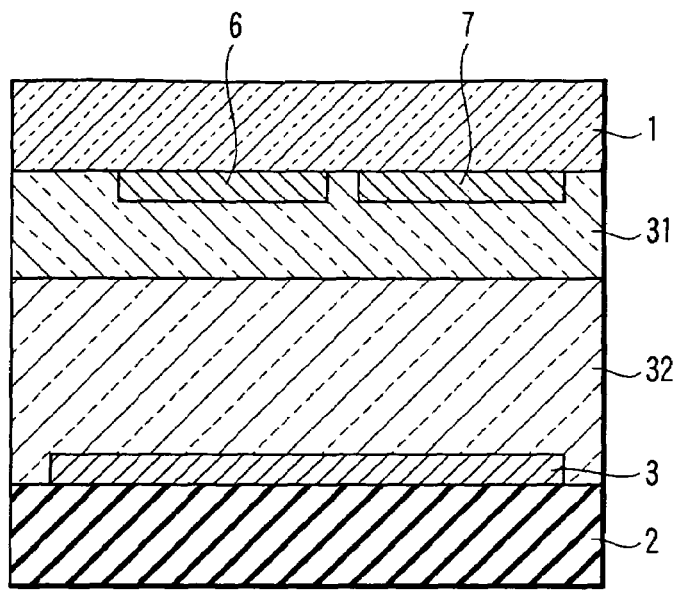
FIG. 5 is a cross-sectional view schematically showing the construction of a display device according to a third embodiment of the present invention.

A display device according to a third embodiment of the present invention will now be described. FIG. 5 is a cross-sectional view showing the construction of the display device according to the fourth embodiment of the present invention. The following description covers those portions alone of the fourth embodiment which differ from the first and second embodiments, and the similar portions are denoted by the same reference numerals in the drawings so as to avoid the duplicated description.

The display device according to the third embodiment of the present invention differs from the display device for the first embodiment in that, in the third embodiment, an electrolyte layer 31, which is a solidified layer containing an ECL material, is formed to cover the first electrode 6, and the second electrode 7, which are formed on the first substrate 1, and another electrolyte layer 32 is formed to cover the third electrode 3 formed on the second substrate 2. The electrolyte layer 32 noted above is in the form of a solidified layer or a liquid layer containing an EC material and an electrolyte. The display device according to the fourth embodiment of the present invention can be driven like the display device according to the first embodiment of the present invention. Where the electrolyte layer 32 containing an EC material is in the form of a solidified layer, the electrolyte layer 32 can be formed by coating the substrate 2 with a solution of an electrolyte material containing an EC material (gel-like high molecular weight compound), followed by drying the coated solution of the electrolyte material. Also, where the electrolyte layer 32 containing an EC material is in the form of a liquid layer, the substrate 2 is bonded to the substrate 1 having the electrolyte layer 31 containing an ECL material formed thereon with the gap between the first substrate 1 and the second substrate 2 controlled by using, for example, a spacer so as to form a cell. Then, a liquid material forming the electrolyte layer 32 is poured into the cell so as to form the electrolyte layer 32 in the form of a liquid layer.

Figure 6:
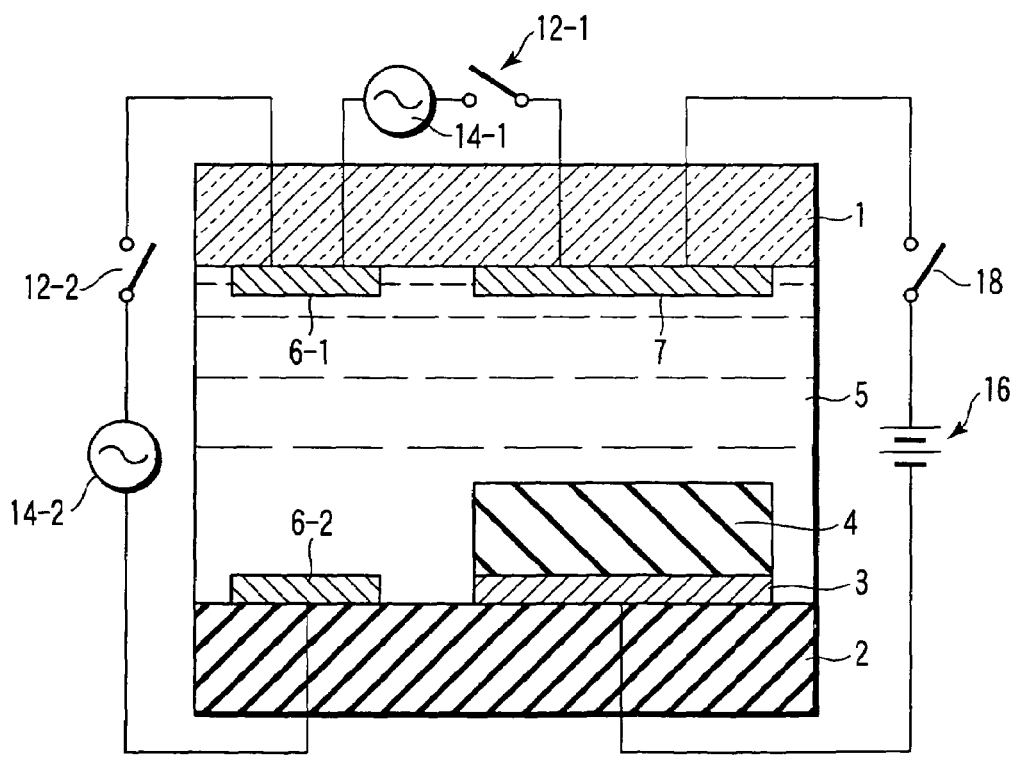
FIG. 6 is a cross-sectional view schematically showing the construction of a display device according to a fourth embodiment of the present invention.

A display device according to a fourth embodiment of the present invention will now be described. FIG. 6 is a cross-sectional view showing the construction of the display device according to the fourth embodiment of the present invention. The following description covers those portions alone of the fourth embodiment which differ from the first embodiment, and the similar portions are denoted by the same reference numerals in the drawings so as to avoid the duplicated description.

As shown in FIG. 6, a first electrode 6-1 and the second electrode 7, which are electrically separated from each other, are formed on the first substrate 1. The second substrate 2 is arranged apart from the first substrate 1 in a manner to face the first substrate 1, and the third electrode 3 and a fourth electrode 6-2, which are electrically separated from each other, are formed on the second substrate 2. Also, as shown in FIG. 6, the first electrode 6-1 and the second electrode 7 are connected to an AC power source 14-1 via a switching element 12-1, and the first electrode 6-1 and the fourth electrode 6-2 are also connected to an AC power source 14-2 or a DC power source via a switching element 12-2 that is opened or closed in synchronism with operation of the switching element 12-1.

In the light-emitting display mode, the switching element 18 is opened so as to permit the first electrode 6-1, the fourth electrode 6-2, the second electrode 7 and the third electrode 3 to be disconnected from the DC voltage source. Also, the switching elements 12-1 and 12-2 are closed so as to permit the first electrode 6-1 and the second electrode 7 to be connected to the AC power source 14-1. In the alternative embodiment, the switching elements 12-1 and 12-2 may cause the first electrode 6-1 and the fourth electrode 6-2 to be connected to the AC power source 14-2 and/or the DC power source. It follows that an AC electric field is generated by the AC power source 14-1 between the first electrode 6-1 and the second electrode 7. Also, an AC electric field is generated by the AC power source 14-2 and/or DC electric field is generated by the DC power source between the first electrode 6-1 and the fourth electrode 6-2. These electric fields cause the first layer 5 containing a light-emitting material to emit light, with the result that the color of the emitted light rays is observed. If a filter is formed on the substrate 1 of this pixel, the color of the filter can be observed from the side of the substrate 1. If the voltage application from the AC power sources 14-1 and 14-2 is stopped, light is not emitted from the first layer 5 so as to cause the background color of the pixel, e.g., black, to be displayed. On the other hand, in the light-reflecting display mode, the switching elements 12-1 and 12-2 are opened, and the switching element 18 is closed, with the result that the first electrode 6-1, the second electrode 7 and the third electrode 3 are disconnected from the DC voltage source 16. It follows that a DC electric field is generated between the second electrode 7 and the third electrode 3 so as to cause the second layer 4 containing a material exhibiting an EC property to be colored or rendered transparent. As a result, the color of the colored second layer 4 is observed from outside the substrate 1. Alternatively, the color of the substrate 2 is observed via the second layer 4 that is rendered transparent as the background color from outside the substrate 1. If the voltage application from the DC voltage source 16 is stopped, the colored second layer 4 is rendered transparent or the transparent second layer 4 is colored, with the result that the background color or the color of the second layer 4 is observed from the side of the substrate 1.

In the light-emitting display mode of the display device shown in FIG. 6, a first AC electric field is generated in a manner to extend along the surface of the substrate 1, and a second AC electric field is generated along the gap between the first substrate 1 and the second substrate 2. It follows that it is possible to further promote the light emission from the first layer 5 containing a light-emitting material in the light-emitting display mode so as to make it possible to permit the pixel structure to emit light with a higher brightness.

An Example of the display device of the present invention will now be described in detail with reference to the accompanying drawings.

EXAMPLE 1

A display device sized at 2.5 inches square was manufactured as follows. Incidentally, each pixel was formed of an electrochemical element of a single color, constructed as shown in FIG. 2, and sized at 100 $\mu$m square.

In the first step, an ITO film was formed to a thickness of 1,000 Å by a sputtering method on a glass substrate having a thickness of 1.1 mm, which was used as the first substrate 1, followed by patterning the ITO film thus formed so as to form the first electrode 6 and the second electrode 7.

In the next step, an ITO film was formed on a glass substrate used as the second substrate 2 to a thickness of 1,000 Å, followed by patterning the ITO film thus formed so as to form the third electrode 3. After the surface of the second substrate 2 having the third electrode 3 formed thereon was subjected to a UV treatment, the surface of the second substrate 2 was coated by a spin coating method with an aqueous solution of peroxopolytungstic acid prepared in advance such that the aqueous solution contained 4 mol/L of tungsten so as to form the EC layer ($WO_3$ film) 4 to a thickness of about 100 nm.

The first substrate 1 and the second substrate 2 were arranged to face each other with a gap of 8 μm provided therebetween by using as a spacer beads each having a particle diameter of 8 μm, followed by solidifying with an epoxy resin the peripheries of the first and second substrates 1 and 2 that were arranged to face each other excluding the pouring port of an electrolyte solution, thereby obtaining a cell.

An electrolyte was prepared by dissolving 100 mM of $LiCF_3SO_3$ used as a supporting salt in a DMF (N,N-dimethyl formamide) solvent. Then, a solution prepared by dissolving 8 mM of $Ru(bpy)_3Cl_2$ECL, i.e., tris(2,2'-bipyridine) ruthenium(II) chloride, which was used as an ECL material, in the electrolyte noted above was poured into the cell so as to form the ECL layer 5. Further, an Al reflective plate prepared in advance was attached to the cell so as to finish preparation of the display device.

The first electrode 6 and the second electrode 7 were set at the same potential, and a voltage was applied such that the potential difference between the reference electrode 10 and the third electrode 3 was set at +1.5V and −2V. As a result, the color erased state (+1.5V) and the colored state (−2V), i.e., colored blue, were achieved in accordance with the change in the polarity of the applied electric field, supporting that it was possible to achieve a light-reflecting display.

Also, an AC voltage of 10 Hz was applied without applying voltage to the third electrode 3 such that a potential difference of 8V was generated between the first electrode 6 and the second electrode 7. As a result, emission of an orange light was observed.

As described above, according to the present invention, it is possible to provide a display device capable of achieving a bright display of a high contrast in both the light-reflecting display mode and the light-emitting display mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device, comprising:
    a first substrate;
    a first electrode and a second electrode both mounted on the first substrate;
    a second substrate arranged to face the first substrate with a gap provided between the first substrate and the second substrate;
    a third electrode mounted on the second substrate;
    a first layer formed in a gap between the first substrate and the second substrate at the side of the first substrate and containing a ECL material that emits light due to electrochemical oxidation or reduction; and
    a second layer formed in the gap between the first substrate and the second substrate at the side of the second substrate and containing a EC material having the color changed due to electrochemical oxidation or reduction.

2. The display device according to claim 1, wherein the first layer is a solidified layer or a liquid layer containing the ECL material and an electrolyte.

3. The display device according to claim 1, wherein the first layer is a solidified layer or a liquid layer containing the ECL material and an electrolyte, and the second layer is a solidified layer containing the EC material and an electrolyte.

4. The display device according to claim 3, wherein at least one of the first layer and the second layer is a liquid layer.

5. The display device according to claim 1, wherein the first layer is a solidified layer containing the ECL material and an electrolyte, the second layer is a solidified layer containing the EC material, and the display device further comprises a third layer, which is a solidified layer arranged in a gap between the first layer and the second layer and containing an electrolyte.

6. The display device according to claim 5, wherein any one of the first layer, the second layer and the third layer is a liquid layer.

7. The display device according to claim 1, wherein the EC material is a inorganic materials selected from a group essentially consisting of $MnO_2$, CoOOH, NiOOH, CuO, $RuO_2$, $Rh_2O_3$, $IrO_x$, prussian blue, $WO_3$, $MoO_3$, $TiO_2$, $V_2O_5$, $Nb_2O_5$ and AgI, a organic materials having a low molecular weight selected from a group essentially consisting of a viologen-based organic material, ortho chloranil, 4-benzoylpyridium derivative, ruthenium tris, ruthenium-bis, osmium-tris and osmium-bis type transition metal complex, a polynuclear complex, or ruthenium-cis-diaqua-bipyridyl complex, a phthalocyanine dye/pigment, a naphthalocyanine dye/pigment, a porphyrin dye/pigment, a perylene dye/pigment, an anthraquinone dye/pigment, an azo dye/pigment, a quinophthalone dye/pigment, a naphthoquinone dye/pigment, a cyanine dye/pigment, a merocyanine dye/pigment, a diphthalocyanine complex, 2,4,5,7-tetranitro-9-fluorene, 2,4,7-trinitro-9-fluorenylidene matrononitrile, and tetracyano quino dimethane, or electrically conductive high molecular weight compounds selected from a group essentially consisting of a polypyrrole derivative, a polythiophene derivative, a polyaniline derivative, a polyazulene derivative, polyisothianaphthene, poly(N-methyl isoindole), poly(dithieno[3,4-b:3',4'-d] thiophene, a polydiallyl amine derivative, a polypyrrolopyrrole derivative, and a Ru complex series conductive high molecular weight compound.

8. The display device according to claim 1, wherein the ECL material is selected from a group essentially consisting of polycyclic aromatic compound, π electron conjugated high molecular weight compounds, hetero aromatic compounds, a chelate metal complex, organic metal compounds and a chelate lanthanoide complex.

9. The display device according to claim 1, wherein the electrolyte comprises a solvent or a gel-like high molecular weight compound that is swollen by the solvent and a supporting salt dissolved in the solvent.

10. The display device according to claim 9, wherein the supporting salt is selected from a group essentially consisting of tetrabutyl ammonium perchlorate, potassium hexafluoro phosphate, lithium trifluoromethane sulfonate, lithium perchlorate, tetra-n-butyl ammonium tetrafluoroborate, tripropyl amine, and tetra-n-butyl ammonium sulfonate.

11. The display device according to claim 9, wherein the solvent for preparing the liquid electrolyte includes is selected from a group essentially consisting of acetonitrile, N,N-dimethyl formamide, propylene carbonate, o-dichloro benzene, glycerin, water, ethyl alcohol, propyl alcohol, dimethyl carbonate, ethylene carbonate, γ-butyrolactone, NMP, 2-methyl tetrahydro furan, toluene, tetrahydro furan, benzonitrile, cyclohexane, normal hexane, acetone, nitrobenzene, 1,3-dioxo furan, furan, and benzotrifluoride.

12. A display device, comprising:
a first substrate;
a first electrode and a second electrode both mounted on the first substrate;
a second substrate arranged to face the first substrate with a gap provided between the first substrate and the second substrate;
a third electrode mounted on the second substrate;
a first layer formed in a gap between the first substrate and the second substrate at the side of the first substrate and containing a ECL material that emits light due to electrochemical oxidation or reduction;
a second layer formed in the gap between the first substrate and the second substrate at the side of the second substrate and containing a EC material having the color changed due to an electrochemical oxidation or reduction;
an AC voltage source which applies an AC voltage between the first substrate and the second electrode so as to generate an AC electric field within the first layer;
a DC voltage source which applies a DC potential to the third electrode so as to generate a DC electric field within the second layer; and
a control section configured to selectively energize the AC voltage source and the DC voltage source so as to cause the first layer to emit light rays under the AC electric field and to cause the second layer to develop a color under the DC electric field.

13. The display device according to claim 12, wherein the second layer is colored so as to exhibit the color of the colored second layer, or the second layer is rendered transparent so as to exhibit the color of the third electrode or the background color of the second substrate.

14. The display device according to claim 12, wherein the DC voltage source serves to apply a DC electric field between the third electrode and at least one of the first and second electrodes.

15. The display device according to claim 12, further comprising a fourth electrode mounted on the second substrate, wherein the AC voltage source includes a first voltage source which applies a first AC voltage between the first electrode and the second electrode and a second voltage source which applies a second AC voltage between the second electrode and the fourth electrode.

16. The display device according to claim 12, wherein the DC voltage source serves to apply a DC electric field between the first electrode and the third electrode.

17. A method of driving a display device, the display device comprising:
a first substrate;
a first electrode and a second electrode both mounted on the first substrate;
a second substrate arranged to face the first substrate with a gap provided therebetween;
a third electrode mounted on the second substrate;
a first layer arranged in a gap between the first substrate and the second substrate at the side of the first substrate and containing a ECL material that emits light as a result of an electrochemical oxidation or reduction; and
a second layer arranged in a gap between the first substrate and the second substrate at the side of the second substrate and containing a EC material having the color changed as a result of an electrochemical oxidation or reduction;
the driving method comprising:
selecting the light-emitting display mode and the light-reflecting display mode;
applying an AC voltage between the first electrode and the second electrode during the light-emitting display mode so as to generate an AC electric field within the first layer and, thus, to permit the first layer to emit light; and
applying a DC potential to the third electrode during the light-reflecting display mode so as to generate a DC electric field within the second layer and, thus, to color the second layer.

18. The method of driving the display device according to claim 17, wherein the second layer is colored so as to display the color of the colored second layer or the second layer is rendered transparent so as to display the color of the third electrode or the background color of the second substrate.

19. The method of driving the display device according to claim 17, wherein the application of the DC potential permits applying a DC electric-field between the third electrode and at least one of the first electrode and the second electrode.

20. The method of driving the display device according to claim 17, wherein the display device further comprises a fourth electrode mounted to the first substrate, and the application of the DC voltage permits applying a DC voltage between the fourth electrode and the third electrode.

21. The method of driving the display device according to claim 17, wherein the display device further comprises a fourth electrode mounted to the second substrate, and the application of the AC voltage permits applying a first AC voltage between the first electrode and the second electrode and a second AC voltage between the second electrode and the fourth electrode.

22. The method of driving the display device according to claim 21, wherein the application of the DV voltage permits applying a DC electric field between the first electrode and the third electrode.

* * * * *